No. 654,542. Patented July 24, 1900.
T. H. HOLMES.
METALLIC PACKING.
(Application filed Aug. 28, 1899.)
(No Model.) 2 Sheets—Sheet 1.
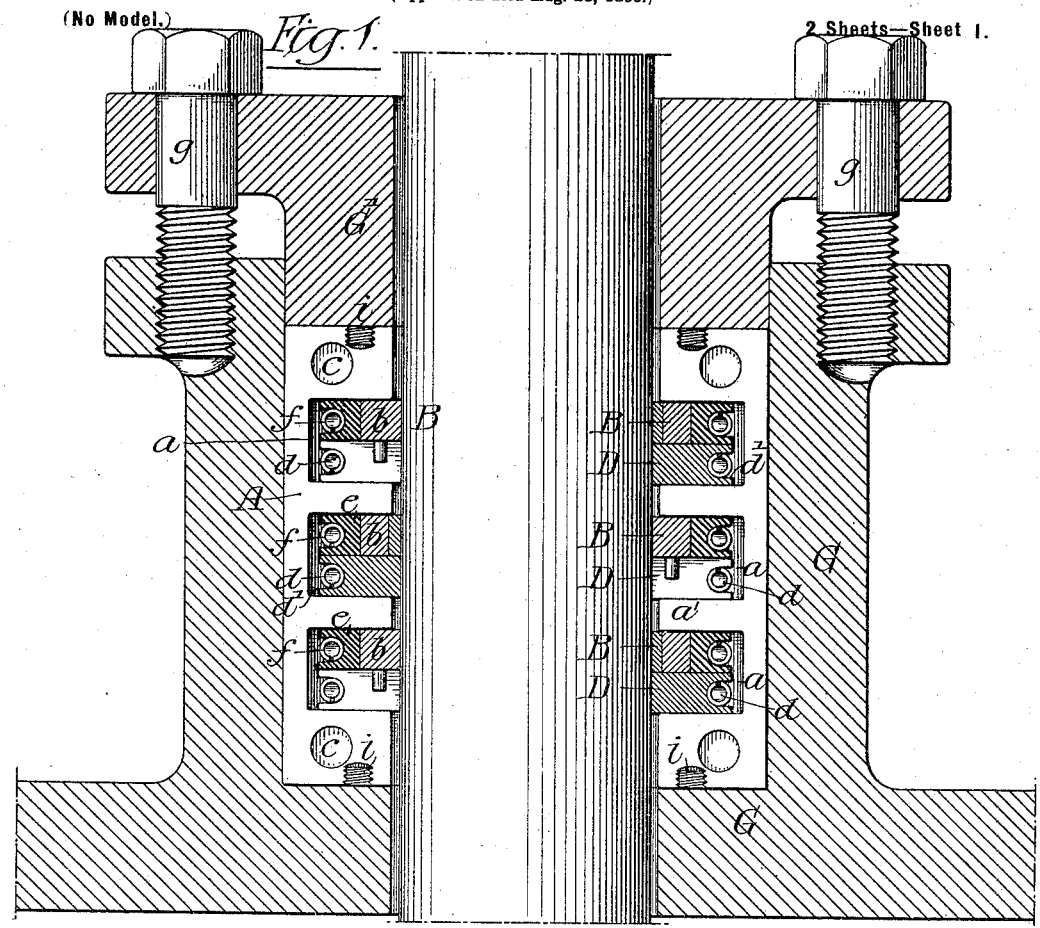
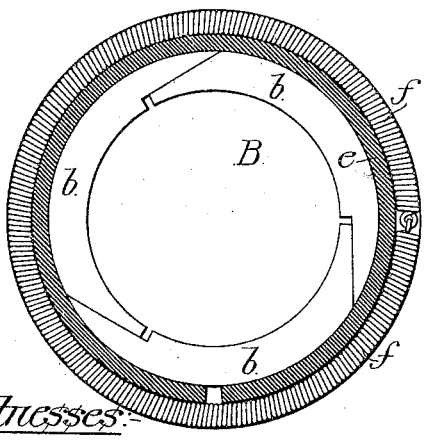
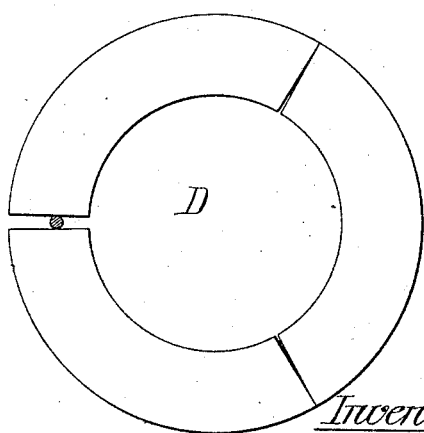

No. 654,542. Patented July 24, 1900.
T. H. HOLMES.
METALLIC PACKING.
(Application filed Aug. 28, 1899.)
(No Model.) 2 Sheets—Sheet 2.

Witnesses:—
Frank L. A. Graham.
Louis M. T. Whitehead

Inventor:—
Thomas H. Holmes.
by his Attorneys:—
Howson & Howson

UNITED STATES PATENT OFFICE.

THOMAS H. HOLMES, OF WILKES-BARRÉ, PENNSYLVANIA.

METALLIC PACKING.

SPECIFICATION forming part of Letters Patent No. 654,542, dated July 24, 1900.

Application filed August 28, 1899. Serial No. 728,747. (No model.)

*To all whom it may concern:*

Be it known that I, THOMAS H. HOLMES, a citizen of the United States, and a resident of Wilkes-Barré, Pennsylvania, have invented certain Improvements in Metallic Packing, of which the following is a specification.

My invention relates to certain improvements in metallic packing whereby the two sections of the containing-casing can be accurately alined.

The object of my invention is to improve the construction of the rings, as fully described hereinafter.

Figure 2:
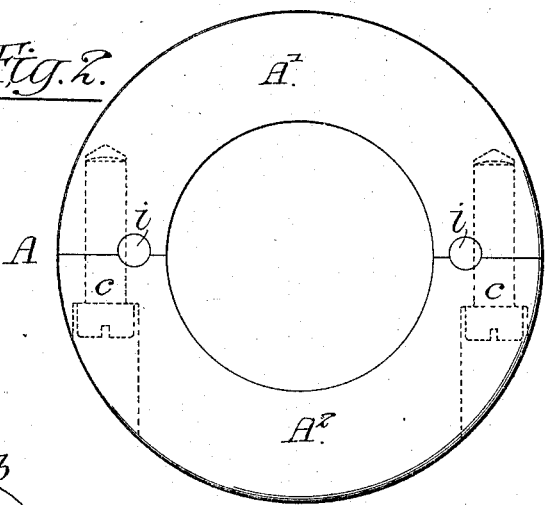
Figure 6:
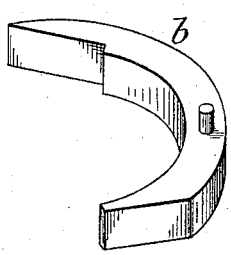
Figure 5:
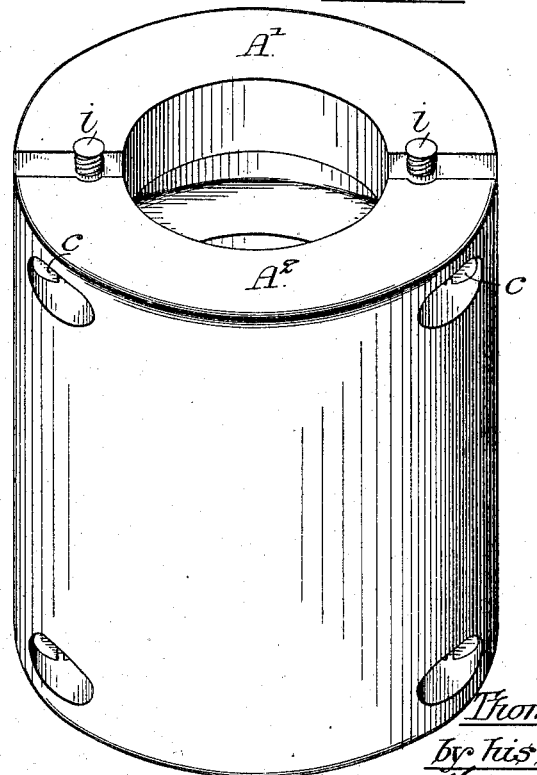

In the accompanying drawings, Figure 1 is a sectional view illustrating my improved packing. Fig. 2 is a plan view of the casing. Fig. 3 is a plan view of one of the rings. Fig. 4 is a plan view of one of the other rings. Fig. 5 is a perspective view of the casing detached, and Fig. 6 is a detached perspective view of a section of one of the rings.

A is a casing made in two halves A' and A². This casing has a series of cavities $a$, separated by partitions $a'$. These cavities are formed to receive the packing-rings B and D. The two halves A' and A² of the casing are secured together by screws $c$, and in order to aline the casing so that the several partitions of the casing will aline properly I drill holes in each end of the casing, partly in one section and partly in the other, and inserted in these holes are ribbed or serrated plugs $i$. The holes are preferably screw-threaded, and the plugs $i$ are also threaded, the threads on the plugs not only holding the plugs in position, but also act as ribs or serrations to aline the two parts of the casing. The center of each hole is preferably to one side of the division-line, so that the screw-threaded plugs will be held in one section of the casing when the casing is removed. By making the plugs screw-threaded I provide a ribbed or serrated face, whereby the sections of the casing are held in more perfect line than if smooth dowel-pins were used. The casing can be removed and the sections separated and placed together, the threaded plugs insuring accuracy.

In the drawings I have shown a casing with three ring-sections; but it will be understood that one or more sections may be used, depending altogether upon the amount of packing required.

There are two sets of rings B and D in each recess $a$. The ring D is made in three sections, as shown in Fig. 3, the sections being separate on radial lines, and these sections are held to the rod E by a coiled spring $d$, fitting in a groove $d'$ in the periphery of the ring. The ring B is made up of three sections $b$, of the form clearly illustrated in Fig. 6, the line of separation being mainly on a tangent. The short portion of the line is radial, as clearly illustrated in Fig. 4. By having the sections of the rings separated, as shown in Fig. 6, the inner and outer bearing-surfaces of each section are at an angle to each other, so that the ring can expand or contract without opening the joints between the several sections. Surrounding the sections $b$ is a soft metallic ring $e$, and bearing against this metallic ring is a spring $f$, confining the ring $e$ to the sections and the sections to the rod.

The casing A is adapted to a box G and is held in place by a cap-ring G' and bolts $g\ g$ in the present instance; but in some instances the casing may be mounted on the exterior surface of a packing-box, where it is wished to apply it to an ordinary form of packing-box.

My invention is especially adapted to piston-rods and valve-stems, especially of the Corliss type.

I claim as my invention—

1. The combination in a metallic packing, of a casing made in two sections, means for securing the two sections together, and one or more ribbed plugs adapted to the casing and fitting partly in one section and partly in the other section, whereby the sections are held against longitudinal or lateral displacement, substantially as described.

2. The combination in a metallic packing, of a two-part casing, packing-rings adapted thereto, one or more screw-threaded plugs mounted in one section of the casing and adapted to screw-threaded cavities in the other section, substantially as described.

3. The combination in a metallic packing, of a casing made in two parts, having one or more cavities, packing-rings adapted to the cavities, transverse screws securing the two sections of the casing together, four screw-plugs adapted to screw-threaded holes in the ends of the casing, said holes being partially in one section and partially in the other, the center of each hole being on one side of the parting-line so that the screw-threaded plugs will be held by one section of the casing when they are parted, substantially as described.

4. The combination in a metallic packing, of a casing having one or more cavities therein, two rings in each cavity, said rings being made in three sections each, one ring being parted on radial lines and situated next to the steam-chamber, the other ring being parted on lines partly radial and partly tangential, whereby the steam from the chamber will gain access to the periphery of the second ring through the radial channels between the sections of the first ring, substantially as described.

5. The combination in a metallic packing, of a casing having one or more cavities therein, two rings in each cavity, said rings being made in three sections each, one ring being parted on radial lines and situated next to the steam-chamber, the other ring being parted on lines partly radial and partly tangential, and a soft-metal band extending around the periphery of the last-mentioned ring, whereby the steam from the chamber will gain access to the periphery of the band on the second ring through the radial channels between the sections of the first ring, substantially as described.

In testimony whereof I have signed my name to this specification in the presence of two subscribing witnesses.

THOMAS H. HOLMES.

Witnesses:
Wm. J. Trembath,
M. E. Joyce.